July 25, 1967

C. S. COOKE 3,332,394

INK SPOT MARKING DEVICE

Filed Oct. 8, 1965

INVENTOR.
CHARLES S. COOKE

BY *Harry R. Lubcke*

AGENT

July 25, 1967 C. S. COOKE 3,332,394
INK SPOT MARKING DEVICE
Filed Oct. 8, 1965 2 Sheets-Sheet 2

INVENTOR.
CHARLES S. COOKE
BY *Harry R. Lubcke*
AGENT though not a part of this invention.

United States Patent Office 3,332,394
Patented July 25, 1967

3,332,394
INK SPOT MARKING DEVICE
Charles S. Cooke, Redwood City, Calif., assignor to Siliconix Incorporated, Sunnyvale, Calif., a corporation of California
Filed Oct. 8, 1965, Ser. No. 494,077
9 Claims. (Cl. 118—263)

ABSTRACT OF THE DISCLOSURE

A precision ink marking device employing an ink-carrying rod, leaf-sprung from a translating mechanism which includes a guide, a crank and a slider. A motor, electromechanically switched to make only one revolution, actuates an arm attached to the crank to move the rod from an inkwell to gently deposit a spot of ink on a workpiece and then return the rod to the inkwell. The motional dynamics can be adjusted to deposit the ink without the rod touching the workpiece, in view of a positive meniscus of ink upon the lower end of the rod.

---

This invention relates to an ink marking device and more particularly to such a device with which an ink spot is placed at a specific point on a workpiece.

In certain precise techniques, of which the production and testing of semiconductor electrical devices such as transistors and integrated circuits is one such technique, it is necessary to identify the characteristics of certain specific parts of a workpiece. In a simple embodiment this reduces to placing an ink spot upon defective entities composing a semiconductor wafer.

It is desirable that this identification be quickly and precisely entered upon the entity in question and that significant mechanical shock or strain be avoided. This might fracture the semiconductor wafer and damage a great number of individual transistors or integrated circuits that have been formed upon the wafer. Absence of clogging, simplicity and versatility are additional preferred features in a device of this kind.

It has been found possible to achieve all of these features in a device according to this invention by employing an inker "rod," formed of a short length of wire, rather than an inker tube for accomplishing the marking. The rod is translated from an open ink well to the point where the ink spot is to be placed. Because a positive meniscus rather than a negative meniscus forms at the bottom of the rod it is possible to deposit a spot of ink upon a workpiece without actually touching the same, or by only a very light touch, depending upon circumstances.

It will be recognized that the known capillary tube inking pen causes an inwardly directed meniscus to form at the writing juncture. This is just the opposite of what is desired in the new arts. Moreover, according to this invention linear resilient means are employed between the inker rod and electromechanical means to place the ink spot upon the workpiece. Such means, in combination with the dynamics of the harmonic motion involved, tends to distort the shape of the drop of ink downward at the end of the stroke because of inertia. This increases the degree of positive meniscus and thus the possibility of marking the workpiece without touching it.

Objects of this invention are, to provide:

a precision inking device;
an inking device in which only ink touches the surface to be marked;
an inking device which, as an alternative, relatively slowly and lightly touches the surface to be marked;
an inking device that is clog-free because of the absence of capillary tube and/or nib elements; and
an inking device which accommodates workpieces of differing thicknesses.

Other objects become apparent upon reading the following specification and upon examining the accompanying drawings, in which are set forth by way of illustration certain embodiments of the invention.

Figure 1:
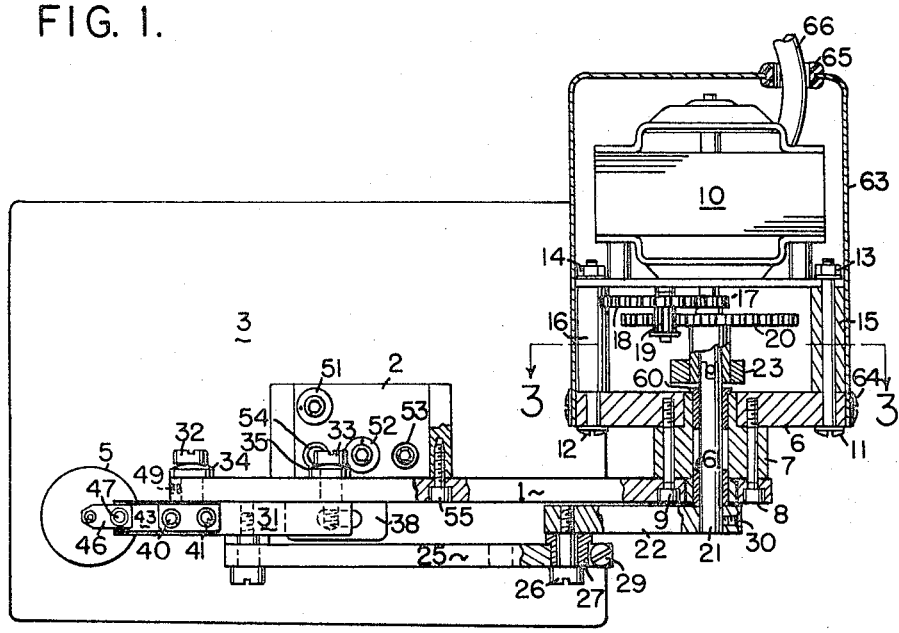
Figure 2:
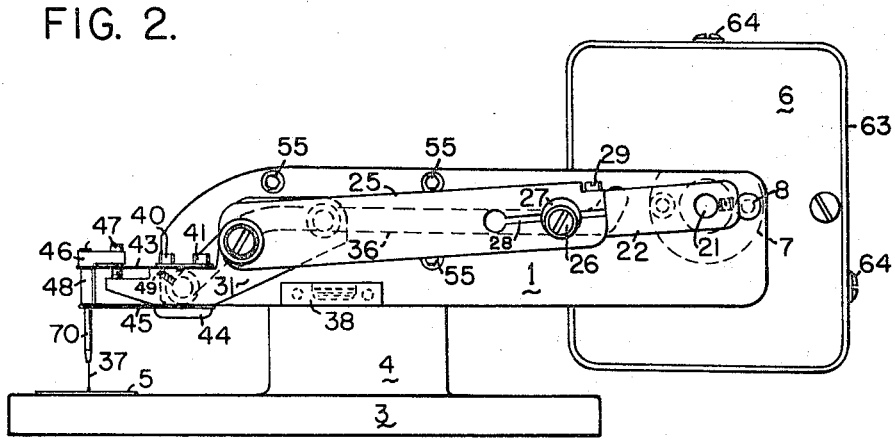
Figure 3:
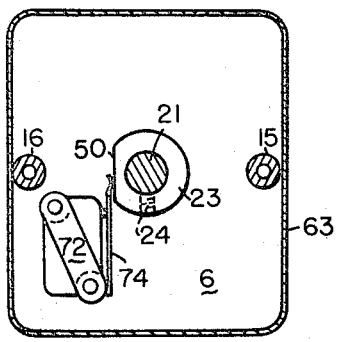
Figure 4:
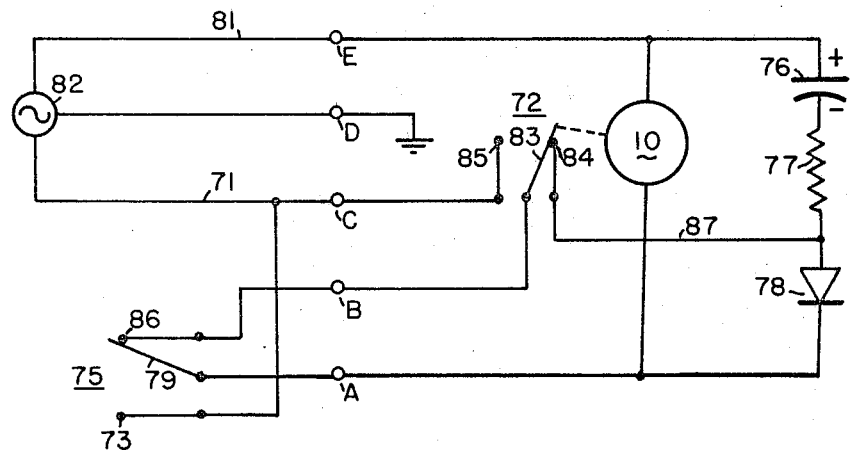

FIG. 1 shows a plan view of the ink spot marking device, partly in section,
FIG. 2 shows a side elevation view of the same,
FIG. 3 shows a detail of the switch mounting, and
FIG. 4 shows the electrical circuit diagram.

In FIGS. 1 and 2, numeral 1 indicates the cam plate, or guide, of the marking device. This plate is stationary. It is attached by bracket 2 to base 3 at pedestal 4. Base 3 also supports workpiece 5, which base may include means for incrementally moving the workpiece. Such means have not been shown, since the same is not a part of this invention.

Motor plate 6 is attached to cam plate 1 at the right extremity thereof through bearing housing 7 and cap screws 8 and 9. Electric motor 10 is attached to the motor plate by means of pan head screws 11 and 12, nuts 13 and 14, and spacers 15 and 16. The motor may be a shaded-pole type with a power rating of 0.0066 horsepower, a speed of 2,400 r.p.m., and may operate at any voltage and with any kind of electrical energy; of which 115 volts 60 cycles alternating current electrical energy is typical.

The speed of rotation of reduced to a suitable value for the operation of the marking device by a gear type speed reducer. This includes pinion 17 on the motor shaft, which meshes with gear 18. This gear has pinion 19 attached and this meshes with gear 20. The latter is fastened upon shaft 21, which shaft also carries crank 22 on the end thereof opposite to the gear. The reduction ratio of this reducer may be 60 to 1.

Also attached to shaft 21 and adjacent to gear 20 is switch cam 23. The cam may be attached to the shaft by set screw 24, and the cam has a flat portion 50, which actuates a switch. See FIG. 3. Crank 22 is positively attached to shaft 21, as by set screw 30 bearing upon a flat on the end of the shaft.

Pitman arm 25 is attached to crank 22 by shoulder screw 26, which screws into the crank and is journalled by eccentric bushing 27 in the arm. This end of the arm is split by slot 28 so that cap screw 29 may be tightened to draw the slot together sufficiently to hold the eccentric bushing at any desired circumferential position, thus to adjust the forwardmost position of slider 31 (to be detailed later) as the crank passes through the forward dead-center position.

Arm 25 has a ratio of slightly over two in length with respect to crank 22. In a typical embodiment the center to center length of the arm is 3³⁄₁₆″, while the corresponding dimension of the crank is 1½″. It will be understood that these dimensions may vary according to the overall size of the device and according to the particular trajectory desired for the ink rod in moving from the ink well to the workpiece.

The far (left) end of arm 25 is provided with slider 31. This piece accomplishes the motion for which all of the rest of the mechanism exists. The slider is provided with two shoulder screws 32 and 33, each of these being provided with a thrust washer, 34 and 35, respectively, under the heads. The shanks of the shoulder screws extend through a carefully machined slot 36 in cam plate 1. As is seen best in FIG. 1, the thrust washers bear against the rear of the cam plate while the slider bears against the front of the same. The shoulder screws are threaded into the slider.

Slot 36 has a downward course at the left end of cam plate 1 and slider 31 is shown at the extreme left end of its travel therein, as best noted in FIG. 2. In this position inker rod 37 deposits an ink spot on workpiece 5. Slot 36 has a short upward course at the right end of cam plate 1. When slider 31 assumes this position, rod 37 has been translated to the right and dipped into inkwell 38. This is the rest position; out of the way to allow other operations upon workpiece 5, and into the inkwell to take on a drop of ink for the next marking of the workpiece. Two dowels fit into holes in the cam plate and extend outwardly to fit into holes in the inkwell. This allows the inkwell to be detached for cleaning. By providing several inkwells, different colored inks and/or other substances may be selectively employed for marking. Also, by providing a small cylindrical magnet in each hole in the inkwell the same is securely held in place until it is removed manually.

In FIG. 2 it will be noted that the left-hand end of slider 31 has a "snout" shape. This serves two purposes. Two cap screws 40 and 41 hold down upper linear resilient means, or leaf spring, 43; while leaf clamp 44 holds upward a second leaf spring 45. Both springs are thus held parallel and project to the left of the snout of slider 31. Leaf clamp 44 is secured by threads therein engaging cap screws 40 and 41, while the body of the cap screws each pass through holes in slider 31.

A retainer 70 passes through holes at the left of each leaf spring and is fastened to bracket 46 by a tight fit in a hole therein. Set screw 47 threads through the right end of the bracket and bears upon essentially the extreme left end of the snout of slider 31. Spacer 48 surrounds retainer 70 and extends between the two spring 43 and 45. The retainer is provided with an axial hole suited to receive inker rod 37. Typically, this may be a 0.010" diameter hole for receiving a 0.009" diameter piece of steel music wire approximately 1½" long. One or more slight bends are formed in the upper part of this wire "rod," so that it fits snugly into the axial hole. In initially adjusting this inker machine set screw 47 is adjusted to just prevent rod 37 from touching workpiece 5 when the thinnest such workpiece expected to be encountered is placed on base 3. The separation may be, say, 0.001 inch. This separation would be ideal, but in practice a variation in thickness of the workpieces does exist. In the silicon wafers of semiconductor manufacturing this is of the order of 0.001 inch. For this reason, leaf springs 43 and 45 are provided, so that should contact between the inker rod and the workpiece eventuate, there will be almost no static force upon the workpiece.

Leaf springs 43 and 45 are preferably formed of a polyester film, such as the known Mylar, the same having a convenient modulus to minimize static force loading of the inker rod upon the workpiece. These springs may be about ⅜" wide, 1½" long and 0.010" thick. Of the length, only about ¾" is free. The low mass of the assembly supported by the leaf springs in combination with the low velocity thereof at the instant of contact with the workpiece, if this should eventuate, combine to reduce to a negligible value any dynamic shock loading upon the workpiece. The low velocity exists by virtue of the substantially harmonic motion imparted to slider 31 by the crank and arm drive 22, 25.

Slot 36 is formed in relation to slider 31 such that inker rod 37 approaches workpiece 5 with a motion that is perpendicular to the workpiece. This is desirable, in that if there is a variation in the thicknesses of the workpieces the position of the ink spot on all of them will be the same desired location. Set screw 49 is provided within a threaded hole that enters the left end of slot 36 to prevent side play in the slot at this critical end position of slider 31. Screw 49 bears against screw 32 in this position. Screw 49 is provided with locking means, such as the known Loc-tite sealant. A suitable lubricant, such as Lubri-Plate, is employed to lubricate the sliding contacts between slide 31 and plate 1, as well as for screws 32 and 33 and slot 36. Screw 32 is made to ride the cam slot to the extreme end by suitable adjustment of eccentric 27 in conjunction with cap screw 29.

The correct position of the ink spot upon workpiece 5 in the horizontal plane is adjusted by moving eccentrics 51 and 52 while hold-down cap screws 53 and 54 are slightly loosened. The latter screws are provided with a Belleville (spring crowned) washer each. An off-center tip on each eccentric fits into a corresponding slot in base 3. Bracket 2 has a vertical flange at each end and four countersunk screws 55 extending from cam plate 1 into these flanges, two at each end. The vertical flanges are relieved adjacent to slot 36 so that the heads of shoulder screws 32 and 33 can pass by.

The 0.009" diameter inker rod previously mentioned makes an ink spot approximately 0.015" in diameter. Larger or smaller ink spots can be obtained by providing rods of larger or smaller diameter, or by varying the depth of immersion of the rod in the inkwell, as by varying the ink level in the inkwell. Each rod must have a flat botttom end, which is obtained by honing, with the feather edge produced by the honing process being removed to give a proper flow of ink.

Returning to the motor portion of the mechanism, actual bearings 60 and 61 fit within bearing housing 7, at each end thereof, and journal shaft 21. Bearings 60 and 61 may be fabricated of known "oil-less" bronze.

A four-side, one-end cover 63 is preferably provided to enclose the motor and gear reduction elements. It is fastened to motor plate 6 by screws 64. Provision is made, by means of a hole and grommet 65, to pass electric cable 66 to a source of electric power for the motor and for the external control thereof.

While cam 23 has been shown in FIG. 1, the electrical switch coactive therewith has not been shown for sake of clarity. This switch, 72, is shown in FIG. 3 in operative relation to the cam and may be the known Microswitch. In the mechanical relation of these parts shown in FIG. 3 the switch is shown in the non-depressed position by virtue of actuator arm 74 resting on the flat face 50 of cam 23. This corresponds to motor 10 being at rest. During the working cycle, arm 74 is in the depressed position for the switch, riding upon the circumferential cylindrical face of the cam. During the working cycle the motor moves shaft 21 through one complete revolution; 360°. This causes the crank and the arm to move slider 31 forward and backward, thereby removing inker rod 37 from the inkwell to the work and return.

FIG. 4 gives the electrical circuit diagram for elements previously detailed in a mechanical sense. Alternating current electric power is applied to terminals denoted C and E. An external control switch 75, which may be a foot-operated switch or of the push-button operated type, is operated to start the inking cycle. A connection is made from the high 115 volt A.C. conductor 71 through contact 73 and switch arm 79 to terminal A and thence through a conductor in previously described electric cable 66 of FIG. 1 to the lower conductor entering motor 10 in FIG. 4. This energizes the motor, since terminal E is always connected to the other, or common, conductor 81 of the power source 82. A safety ground connection is carried through the apparatus and is grounded at terminal D.

As soon as motor 10 starts, switch 72 is operated by cam 23. Arm 74 moves from the flat 50 to the circumferential face. Switch arm 83 then leaves the normally closed contact 84 and makes an electrical connection to normally open contact 85. Through conductor 71, terminal C, switch 72 and terminal B energizing electrical energy continues to be supplied to the motor through normally closed contact 86 of switch 75. This circuit arrangement causes the motor to always complete a marking cycle once it has been initiated by a momentary actuation of manually operated switch 75.

Connected to terminal E and the upper motor terminal is capacitor 76. In series therewith is resistor 77 and diode 78, the second terminal of the diode being connected to terminal A and the lower motor terminal. A conductor 87 connects from the connection common to resistor 77 and diode 78 to normally closed contact 84 of switch 72. These three elements comprise an electrically energized magnetic brake upon motor 10. The capacitor may have a capacitance of 140 microfarads and a 250 volt rating, resistor 77 a resistance of 200 ohms and a 10 watt rating, and diode 78 may be of the 1N3283 type, having a 1,500 peak inverse voltage and 100 milliampere rating.

While motor 10 is operating capacitor 76 accumulates a ("direct current") charge through resistor 77 because of the rectification of the alternating current supplied to operate the motor. When crank 22 has almost completed its mechanical cycle, switch 72 is returned to its nondepressed position; i.e., switch arm 83 contacting contact 84. This occurs because of the flat 50 on cam 23, as has been described. This switch action breaks the alternating current line connection to the motor and connects the series combination of capacitor 76 and resistor 77 across the motor terminals instead. This connection is effected through switch 72, terminal B, switch 75 (contact 86 is the normally closed one), terminal A, and the lower connection to motor 10. Capacitor 76 charges to a D.C. voltage substantially equal to the peak value of the A.C. motor operating voltage. When this voltage is impressed across the motor, a direct current flows in the field coil thereof and this produces a magnetic flux of fixed polarity in the stator thereof. The rotor, in moving through this flux, induces currents within itself, the magnetic fields of which coact with the field flux and develop a braking torque in the rotor. This braking action is strong and consistent. By suitably adjusting the circumferential orientation of cam 23 about shaft 21, motor 10 may always be brought to a halt with crank 22 in a position such that inker rod 37 is immersed to its maximum depth in inkwell 38.

Certain modifications may be made in the structure and functioning of this ink spot marking device within the scope of this invention. These include changes in the details of the arrangement of the elements, and alteration of the size, proportions and shape of the device.

Having thus fully described this invention and the manner in which it is to be practiced, I claim:

1. A marking device for placing an ink spot upon a workpiece comprising;
    (a) an inker rod,
    (b) an ink well having an open top to receive said inker rod,
    (c) linear resilient means attached to said inker rod, and
    (d) cyclically operable electromechanical means, including a guide, connected to said resilient means, to lift said inker rod out of said ink well, to translate said inker rod to said workpiece, to deposit an ink spot thereon, and to return said inker rod to said ink well.

2. The marking device of claim 1 in which said cyclically operable electromechanical means includes;
    (a) a crank, said guide and a slider to impart a downward motion to said inker rod as it approaches said workpiece, and
    (b) means to adjust the rest position of said linear resilient means to deposit a drop of ink upon said workpiece without said inker rod touching said workpiece.

3. The marking device of claim 1 in which said cyclically operable electromechanical means includes;
    (a) a crank and said guide having a slot to impart a perpendicular approaching motion to said inker rod with respect to said workpiece, and
    (b) means to adjust the vertical rest position of said linear resilient means to allow said inker rod to just touch said workpiece.

4. The marking device of claim 2 which additionally includes;
    (a) means to adjust the mean position of said slider relative to said crank,
        whereby the forwardmost position of said slider on said guide is accurately mechanically determined.

5. The marking device of claim 3 in which;
    (a) said inker rod as supported by said linear resilient means is of low mass, and
    (b) said crank and guide are proportioned to impart a substantially harmonic velocity to said linear resilient means,
        whereby said velocity becomes relatively low as said inker rod approaches said workpiece,
        and in combination with said low mass said inker rod impinges upon said workpiece with negligible dynamic shock.

6. The marking device of claim 1 in which said resilient linear means comprises;
    (a) a pair of spaced spring strips extending between said electromechanical means and the upper and lower portions of said inker rod.

7. The marking device of claim 6 in which;
    (a) said pair of spaced spring strips are formed of a plastic film material, having a modulus and structural dimensions such as to impinge said inker rod upon said workpiece with negligible static force.

8. The marking device of claim 1 in which said cyclically operable electromechanical means includes;
    (a) an electric switch, and
    (b) a cam connected to said electromechanical means to actuate said switch for single-cycle mechanoelectrical operation of said electromechanical means.

9. The marking device of claim 1 in which said cyclically operable electromechanical means includes;
    (a) an electric motor,
    (b) an electrical rectifier and a charge-storing circuit connected thereto,
    (c) switch means to allow the accumulation of a charge by said charge-storing circuit through said rectifier during the translation of said inker rod, and the discharge of said charge-storing circuit through said motor to brake the same after said translation.

References Cited
UNITED STATES PATENTS

| | | | |
|---|---|---|---|
| 2,146,599 | 2/1939 | Smith | 33—174 |
| 2,535,633 | 12/1950 | Hobbs | 33—174 |
| 2,712,180 | 7/1955 | Lueck | 33—174 |
| 2,917,971 | 12/1959 | Goddu et al. | 33—174 X |
| 3,034,478 | 5/1962 | Schwartz. | |

CHARLES A. WILLMUTH, *Primary Examiner.*

R. I. SMITH, *Assistant Examiner.*